United States Patent [19]

Noguchi et al.

[11] Patent Number: 5,318,828
[45] Date of Patent: Jun. 7, 1994

[54] MAGNETIC RECORDING MEDIUM HAVING MULTIPLE MAGNETIC LAYERS COMPRISING MAGNETIC PARTICLES AND POLYURETHANE RESINS HAVING GLASS TRANSITION TEMPERATURES WITHIN SPECIFIED RANGES

[75] Inventors: Hitoshi Noguchi; Shinji Saito; Hiroshi Ogawa, all of Kanagawa, Japan

[73] Assignee: Fuji Photo Film Co., Ltd., Kanagawa, Japan

[21] Appl. No.: 26,164

[22] Filed: Mar. 1, 1993

Related U.S. Application Data

[63] Continuation of Ser. No. 644,663, Jan. 23, 1991, abandoned.

[30] Foreign Application Priority Data

Jan. 23, 1990 [JP] Japan .................................. 2-13213

[51] Int. Cl.$^5$ ........................................ G11B 5/00
[52] U.S. Cl. .................................. 428/212; 428/216; 428/328; 428/336; 428/424.6; 428/425.1; 428/425.9; 428/522; 428/694 BM; 428/694 BS; 428/694 BP; 428/900; 427/131; 427/548; 427/599
[58] Field of Search ............ 428/900, 694, 336, 424.6, 428/425.9, 425.1, 212, 216, 328, 694 BM, 694 BS, 694 BP, 522; 427/131, 548, 599

[56] References Cited

U.S. PATENT DOCUMENTS

| | | | |
|---|---|---|---|
| 4,812,369 | 3/1989 | Hanai et al. | 428/425.9 |
| 4,980,230 | 12/1990 | Saito et al. | 428/329 |
| 5,084,335 | 1/1992 | Nakano et al. | 428/323 |
| 5,094,910 | 3/1992 | Kaneno et al. | 428/329 |

OTHER PUBLICATIONS

"Polymer Chemistry" Malcolm P. Stevens, Oxford University Press 1990 p. 81.

*Primary Examiner*—Stevan A. Resan
*Attorney, Agent, or Firm*—Sughrue, Mion, Zinn, Macpeak & Seas

[57] ABSTRACT

A magnetic recording medium is disclosed comprising a non-magnetic support having provided thereon a plurality of magnetic layers containing a ferromagnetic powder dispersed in a binder, wherein the lower magnetic layer closest to the support contains as the binder at least one polyurethane resin having a glass transition temperature (Tg) of from −50° C. to −10° C., and the uppermost magnetic layer contains as the binder at least one polyurethane resin having a glass transition temperature of from more than 40° C. to 100 ° C.

The magnetic recording medium of the present invention exhibits excellent running durability as well as electromagnetic conversion characteristics.

11 Claims, No Drawings

MAGNETIC RECORDING MEDIUM HAVING MULTIPLE MAGNETIC LAYERS COMPRISING MAGNETIC PARTICLES AND POLYURETHANE RESINS HAVING GLASS TRANSITION TEMPERATURES WITHIN SPECIFIED RANGES

This is a Continuation of Application No. 07/644,663 filed Jan. 23, 1991, now abandoned.

FIELD OF THE INVENTION

The present invention relates to a magnetic recording medium comprising a magnetic layer having a multilayer.

BACKGROUND OF THE INVENTION

A magnetic recording medium is widely used, for example, as a recording tape, a video tape, or a floppy disc. Magnetic recording media generally comprise a non-magnetic support and a magnetic layer arranged on the support, the magnetic layer comprising a binder and a ferromagnetic powder dispersed therein.

Magnetic recording media are evaluated with respect to electromagnetic conversion characteristics, running durability and running performance. For example, an audio tape for recording and reproduction of music desirably has a high sound reproducing ability. On the other hand, a video tape desirably has excellent electromagnetic conversion characteristics such as original picture reproducing ability.

In addition to the above described electromagnetic conversion characteristics, the magnetic recording medium desirably has good running durability. The running durability is generally provided by use of an abrasive and a lubricant.

However, if it is intended to obtain the desired running durability using an abrasive, it is necessary to increase the content of the abrasive in the magnetic layer. However, an increase in the content of the abrasive decreases the content of the ferromagnetic powder in the magnetic layer. When an abrasive having a large particle size is used to obtain excellent running durability, the abrasive tends to diffuse to the surface of the magnetic layer. Thus, in many cases, the improvement in the running durability by using an abrasive deteriorates the electromagnetic conversion characteristics.

Also, when the running durability is enhanced by using a lubricant, it is necessary to increase the content of the lubricant in the magnetic layer. An increase in the content of the lubricant plasticizes the binder, and the durability of the magnetic layer tends to decrease.

As another method for improving the running durability, a hard binder has been used to increase the hardness of the magnetic layer. An increase in the hardness of the magnetic layer is disadvantageous because the magnetic layer becomes markedly fragile, drop out results by contact with a magnetic head, and other characteristics (e.g., durability during still) are deteriorated.

In addition, a magnetic recording medium comprising polyisocyanate, a polyurethane resin containing a hydroxyl group and having a molecular weight of less than 10,000, and a resin having an active hydrogen atom is disclosed in JP-A-58-153224 (the term "JP-A" as used herein means an "unexamined published Japanese patent application"). The polyurethane resin (or other resin) having an active hydrogen atom (for example, a hydroxyl group) reacts with polyisocyanate (cross-linking agent), to provide a magnetic layer which is very stiff. Thus, a magnetic layer is obtained which exhibits less decrease in output even when stored for a long time, and which has good durability. However, the above described magnetic layer is unsatisfactory with respect to running durability because the adhesion of the magnetic layer to the non-magnetic support is poor.

As a technique for improving both the electromagnetic conversion characteristics and the running durability, a magnetic recording medium is proposed in JP-A-63-103429 comprising two magnetic layers provided on a non-magnetic support, said layers containing a ferromagnetic powder dispersed in a binder and having a coercive force of not less than 500 Oe, wherein the lower magnetic layer (first magnetic layer) disposed closest to the non-magnetic support has a Young's modulus of 500 to 1,000 kg/mm$^2$ and the upper magnetic layer (second magnetic layer) has a Young's modulus of not less than 1,300 kg/mm$^2$. Furthermore, the Young's modulus of the entire magnetic layer comprising said first and second magnetic layers is at least 900 kg/mm$^2$. According to the disclosure of JP-A-63-103429, the lower magnetic layer is soft such that it has a high buffer action and high adhesive properties, and the upper magnetic layer is increased in hardness such that it is less deformed even when stored under high temperature conditions. Furthermore, the magnetic recording medium is said to have improved running durability.

For obtaining the above described Young's modulus of the first and second layers, a number of techniques can be employed, including a method wherein substantially equal amounts of the ferromagnetic powder are used, and the first magnetic layer (lower layer) employs a binder having a lower Young's modulus than that used in the second magnetic layer (upper layer); a method wherein equal amounts of binder are used, and the amount of the ferromagnetic powder contained in the first magnetic layer is less than that contained in the second magnetic layer; and a method wherein both the amount of the ferromagnetic powder and the amount of the binder are controlled, to thereby obtain the desired Young's modulus of the first magnetic layer and the Young's modulus of the second magnetic layer.

However, JP-A-63-103429 only discloses a technique for obtaining the desired Young's modulus using the same binder in both the first and second magnetic layers, by changing the relative amount of a vinyl chloride-vinyl acetate-vinyl alcohol copolymer component (i.e., a relatively hard binder component) to the amount of a polyester-polyurethane (i.e., a relatively soft binder component). With the above described combination, however, in the lower magnetic layer (first magnetic layer) having a smaller Young's modulus, the amount of the vinyl chloride-based copolymer having relatively good dispersibility is decreased, and the amount of the polyester-polyurethane having poor dispersibility is correspondingly increased, such that the overall dispersibility of the lower layer is markedly reduced. As a result, the upper layer (second magnetic layer) exhibits poor surface properties and low strength. On the other hand, in the present invention, the glass transition temperature Tg of the polyurethane component of the binder is controlled to provide both excellent electromagnetic conversion characteristics and running durability.

SUMMARY OF THE INVENTION

An object of the present invention is to provide a novel magnetic recording medium comprising a plurality of magnetic layers.

A second object of the present invention is to provide a magnetic recording medium having excellent electromagnetic conversion characteristics.

A further object of the present invention is to provide a magnetic recording medium having excellent running durability.

The above objects are attained by a magnetic recording medium comprising a non-magnetic support having provided thereon a plurality of magnetic layers containing a ferromagnetic powder dispersed in a binder, wherein the lower magnetic layer closest to the support (i.e., the lower magnetic layer) contains as the binder at least one polyurethane resin having a glass transition temperature (Tg) of from $-50°$ C. to $-10°$ C., and the uppermost magnetic layer contains as the binder at least one polyurethane resin having a glass transition temperature of from more than $40°$ C. to $100°$ C.

More preferably, the above objects of the present invention are attained by a magnetic recording medium wherein the $S_{BET}$ of the ferromagnetic powder contained in the upper-most magnetic layer is greater than 35 m$^2$/g, and the total amount of the binder contained in the uppermost magnetic layer is from 10 to 30% by weight of the ferromagnetic powder contained in the same layer.

As used herein the "lower" magnetic is the magnetic layer arranged closest to the support.

In the magnetic recording medium comprising a plurality of magnetic layers of the present invention, a polyurethane resin having a low Tg is contained in the lower magnetic layer to improve calender moldability and adhesion to the non-magnetic support, and in the uppermost magnetic layer, a polyurethane resin having a high Tg is used to improve durability under high temperature and humidity conditions.

DETAILED DESCRIPTION OF THE INVENTION

Preferred embodiments of the magnetic recording medium of the present invention are as follows:

(1) A magnetic recording medium obtained by coating a lower magnetic layer onto the support, coating the uppermost magnetic layer onto the lower magnetic layer while in a wet condition, and then orientating, drying and applying surface treatment.

(2) A magnetic recording medium wherein the content of the polyurethane resin in each of the lower magnetic layer and the uppermost magnetic layer is from 10% by weight to 70% by weight based on the total weight of the binder contained in each magnetic layer.

(3) A magnetic recording medium wherein the lower magnetic layer and the uppermost magnetic layer contain a polyisocyanate hardener as a binder component (preferably in the content of 10% by weight to 70% by weight based on the total weight of the binder contained in each magnetic layer).

(4) A magnetic recording medium wherein the polyurethane resin contained in the uppermost magnetic layer contains at least three OH groups per molecule thereof.

(5) A magnetic recording medium wherein the lower magnetic layer and the uppermost magnetic layer each contain a vinyl chloride-based copolymer or a cellulose-based resin as a binder component (preferably in the content of 30% by weight to 80% by weight based on the total weight of the binder contained in each magnetic layer).

(6) A magnetic recording medium wherein the dry thickness of the lower magnetic layer is at least 2.0 $\mu$m, and the dry thickness of the uppermost magnetic layer is not more than 1.5 $\mu$m.

(7) A magnetic recording medium wherein the coercive force of the uppermost magnetic layer is from 400 Oe to 2200 Oe, and the coercive force of the lower magnetic layer is from 1 to 0.1 times that of the uppermost magnetic layer.

The present invention is described below in detail.

The polyurethane resin for use in the present invention is obtained by reacting a polyol such as polyesterpolyol, polyetherpolyol, polycarbonatepolyol, polyesterpolycarbonate, polyesterpolyether, or polycaprolacton, with an isocyanate, and if desired, with a chain extension agent and other compounds. Method for the preparation of the polyurethane resin for use in the present invention are disclosed, for example, in Keiji Iwata, *Plastics Zairyo Koza* (Series of Lectures on Plastics), Vol. 2, "Polyurethane Resins", and Keiji Iwata, *Polyurethane Resin Handbook*, both published by Nikkan Kogyo Shinbun-Sha.

The above described polyurethane resin either exhibits or does not exhibit a yield point depending on the skeleton structure of the polyol and the concentration of the urethane group. In the present invention, the polyurethane resin is preferably not used alone, but in combination with another resin, i.e., in an amorphous condition, such that the yield point is not particularly limiting.

In order to increase dispersibility and running durability, the polyurethane molecule in the magnetic layers preferably contains a —COOM, —SO$_3$M, —SO$_4$M, —PO$_3$M$_2$, —OPO$_3$M$_2$, an amino group, an ammonium salt group, —OH, —SH, or an epoxy group (wherein M represents hydrogen, an alkali metal or ammonium, which M groups may be the same or different). With regard to the polar group content, the content of the —COOM, —SO$_3$M, —SO$_4$M, —PO$_3$M$_2$, —OPO$_3$M$_2$, amino group or ammonium salt group is preferably from $10^{-7}$ to $10^{-3}$ equivalent per gram of the polyurethane resin component, and preferably from $0.5 \times 10^{-5}$ to $60 \times 10^{-5}$ equivalent per gram, and the content of the —OH, —SH, or epoxy group is preferably from $5 \times 10^{-5}$ to $200 \times 10^{-5}$ equivalent per gram of the polyurethane resin component. If the polar group content is less than the above lower limit, a dispersing effect is not obtained. On the other hand, if the polar group content is greater than the above upper limit, solvent solubility is reduced and dispersibility is decreased.

The —OH and —SH groups are effective for increasing running durability, particularly when a polyisocyanate hardener is used in combination with the polyurethane resin.

The polyurethane resin for use in the present invention preferably contains three of the above described polar groups per molecule. The —OH and —SH groups of the polyurethane react with the polyisocyanate, to form a network structure to thereby remarkably improve the running durability.

The weight-average molecular weight of the binder is preferably from 10,000 to 100,000 and more preferably from 20,000 to 60,000.

The glass transition temperature (Tg) of the polyurethane resin for use in the lower magnetic layer is from −50° C. to −10° C. If the Tg is less than −50° C., the running durability is decreased. On the other hand, if the Tg is greater than −10° C., the electromagnetic conversion characteristics are deteriorated.

The glass transition temperature (Tg) of the polyurethane resin for use in the uppermost magnetic layer is from more than 40° C. to 100° C. If the Tg is not more than 40° C., the running durability is decreased, while on the other hand, if the Tg is more than 100° C. the electromagnetic conversion characteristics are deteriorated.

The Tg of the polyurethane resin for use in the present invention can optionally be set by appropriately changing the ratios and kinds of the aromatic monomers and aliphatic monomers constituting the polyurethane.

Examples of the polyurethane resin having a glass transition temperature of from −50° C. to −10° C. for use in the lower magnetic layer include N-2304, FR-11 (produced by Nippon Polyurethane Co., Ltd.), and Crisvon 7209, Pandex 5102S, Tyforce CV-148 (produced by Dainippon Ink & Chemicals, Inc.).

Examples of the polyurethane resin having a glass transition temperature of from more than 40° C. to 100° C. for use in the uppermost magnetic layer include UR-8200, UR--4300 (produced by Toyobo Co., Ltd.), TI-3073, TI--3065 (produced by Sanyo Kasei Co., Ltd.), and CA-118 (produced by Morton Chemical Corp.). The polyurethane resin preferably contains a polar functional group.

The Tg of the polyurethane resin is measured by an ordinary method as disclosed in Okamura et al., *Kobunshi Kaqaku Joron* (*Introduction to High Polymer Chemistry*), published by Kabushiki Kaisha Kagaku Dojin.

The content of the polyurethane resin is at least 5% by weight, preferably at least 10% by weight based on the total weight of the binder contained in each magnetic layer. The content of the polyurethane resin is up to 100% and preferably 70% by weight or less based on the total weight of the binder contained in each magnetic layer. If the polyurethane resin content is less than 5% by weight, the electromagnetic conversion characteristics are deteriorated. On the other hand, if the polyurethane resin content is more than 70% by weight, the running durability under high temperature and humidity conditions is somewhat reduced.

Other binders for use in combination with the polyurethane resin of the present invention include resins and hardeners soluble in the polyurethane resin and having a glass transition temperature of at least 50° C. Preferred examples include a vinyl chloride-based copolymer resin, a cellulose-based resin, and a polyisocyanate hardener.

The above noted vinyl chloride-based copolymer resin is a copolymer containing vinyl chloride as the main component. Examples include copolymers of vinyl chloride with monomers such as vinyl acetate, acrylic acid, methacrylic acid, maleic acid, maleic anhydride, and vinyl alcohol. The vinyl chloride-based copolymer resin preferably contains a polar functional group. Examples of such functional groups include a hydroxyl group, a carboxyl group, a sulfonic acid group, a sulfonic acid metal salt group, a phosphoric acid group, a phosphoric acid ester group, a phosphoric acid metal salt group, an epoxy group, an amino group, and a cyano group.

Examples of the above noted cellulose-based resin include nitrocellulose, acetylcellulose, methylcellulose, ethylcellulose, cellulose acetate butyrate, cellulose propionate, cellulose acetate propionate, hydroxyethylcellulose, and carboxymethylcellulose.

The number-average molecular weight of the vinyl chloride-based resin or the cellulose-based resin is preferably from 5,000 to 50,000.

The difference between the content, in terms of percent by weight, of the vinyl chloride-based copolymer resin or the cellulose-based resin to the ferromagnetic powder in the uppermost magnetic layer, and the content, in terms of percent by weight, of the vinyl chloride-based resin or the cellulose-based resin to the ferromagnetic magnetic powder in the lower magnetic layer is preferably not more than 30%. If the difference is in excess of 30%, the surface property of the superposed layer is deteriorated.

The polyisocyanate hardener for use as a binder component of the present invention includes, for example, aliphatic, alicyclic or aromatic (e.g., benzene, naphthalene, biphenyl, diphenylmethane, or triphenylmethane) di-, tri- or tetraisocyanate, having at least two isocyanate groups, and adducts thereof. Examples include isocyanates such as ethane diisocyanate, butane-$\omega,\omega'$-diisocyanate, hexane di-$\omega,\omega'$-diisocyanate, 2,2-dimethylpentane-$\omega,\omega'$-diisocyanate, 2,2,4-trimethylpentane-$\omega,\omega'$-diisocyanate, decane-$\omega,\omega'$-diisocyanate, $\omega,\omega'$-diisocyanate-1,3-dimethylbenzole, $\omega,\omega'$-diisocyanate-1,2-dimethylcyanohexane, $\omega,\omega'$-diisocyanate-1,4-diethylbenzole, $\omega,\omega'$-diisocyanate-1,5-dimethylnaphthalene, 1,3-phenylene diisocyanate, 1-methylbenzole-2,4-diisocyanate, 1,3-dimethylbenzole-2,6-diisocyanate, naphthalene 1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-triisocyanate, diphenylmethane-2,4,4'-triisocyanate, triphenylmethane-4,4',4''-triisocyanate, trylenediisocyanate, and 1,5-naphthylenediisocyanate; dimers or trimers of the above isocyanates; and adducts of the above isocyanates and divalent or trivalent polyalcohols. Examples of such adducts include an adduct of trimethylolpropane and trylenediisocyanate, and an adduct of trimethylolpropane and hexamethylene diisocyanate.

Of the above polyisocyanate hardeners, those containing at least three isocyanate groups per molecule are preferred.

In order to increase the electromagnetic conversion characteristics, the total amount of the binder contained in the upper magnetic layer is preferably from 10 to 30% by weight of the ferromagnetic powder contained in the same layer, and from 15 to 25% by weight being particularly preferred. If the content of the binder is more than 30% by weight, the degree of charging is decreased and the electromagnetic conversion characteristics are deteriorated. On the other hand, if the binder content is less than 10% by weight, the strength of the magnetic layer is decreased and the running durability is reduced. Furthermore, the ferromagnetic powder is not adequately dispersed, leading to a reduction of the electromagnetic conversion characteristics.

As the ferromagnetic powder, known powders can be used without any particular limitation. Examples of suitable ferromagnetic powders include $\gamma$-$Fe_2O_3$, Co-containing $\gamma$-$Fe_2O_3$, $Fe_3O_4$, Co-containing $Fe_3O_4$, Berthollide compound of $\gamma$-$Fe_2O_3$ and $Fe_3O_4$ ($FeO_x$, $1.33<x<1.50$), Berthollide compound of Co-containing $\gamma$-$Fe_2O_3$ and $Fe_3O_4$ ($FeO_x$, $1.33<x<1.50$), $CrO_2$, Co-Ni-P alloy, Co—Ni—Fe alloy, Co—Ni—Fe—B alloy, Fe—Ni—Zn alloy, Fe—Mn—Zn alloy, Fe—Co—Ni—P alloy, and Ni—Co alloy. Specific examples of the ferromagnetic powders are described, for example, in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, and JP-B-48-39639, U.S. Pat. Nos. 3,026,215, 3,031,341, 3,100,194, 3,242,005, and 3,389,014, British Patents 752,659, 782,762, and 1,007,323, French Patent 1,107,654, and West German Patent Application (OLS) No. 1,281,334.

The ferromagnetic powder has a particle size of about 0.1 to 1 $\mu$m in length, and the ratio of length to width is from about 1/1 to about 20/1.

The content of the ferromagnetic powder in the magnetic layer is generally from 50% by weight to 80% by weight, preferably from 70% by weight to 80% by weight. The coercive force of the ferromagnetic powder for use in the uppermost magnetic layer is preferably from 350 to 2,500 Oe and particularly preferably from 400 to 2,200 Oe.

In order to enhance the electromagnetic conversion characteristics, the specific surface area ($S_{BET}$) of the ferromagnetic powder is preferably more than 35 $m^2/g$ and a specific surface area of at least 40 $m^2/g$ is particularly preferred. The crystal size is preferably not more than 400 Å, and the particle size is preferably not more than 0.3 $\mu$m.

If the coercive force is less than 350 Oe, the high frequency characteristics of a normal bias position audio tape is reduced. On the other hand, if the coercive force is more than 2,500 Oe, record erasing with a typical magnetic head becomes difficult.

The coercive force of the ferromagnetic powder for use in the lower magnetic layer is preferably equal to or less than that of the ferromagnetic powder contained in the uppermost magnetic layer, the specific surface area is preferably smaller than that of the ferromagnetic powder contained in the uppermost magnetic layer, and the crystal size is preferably larger than that of the ferromagnetic powder contained in the uppermost magnetic layer.

The coercive force of the lower magnetic layer is preferably equal to or less than that of the upper magnetic layer. In the case of deep layer recording as in a recording medium for audio, it is preferred that the coercive force of the lower magnetic layer be about 0.5 to 1.0 time that of the uppermost magnetic layer. In the case of surface layer recording as in video or digital tapes, it is preferred that the coercive force of the lower magnetic layer be 0.1 to 1.0 time that of the uppermost magnetic layer.

The specific surface area and crystal size of the ferromagnetic powder contained in the lower magnetic layer are preferably smaller than these of the ferromagnetic powder contained in the upper layer such that the transfer characteristics are enhanced and the production cost is reduced.

In the present invention, the magnetic layer may contain, as well as the ferromagnetic powder, a non-magnetic powder such as carbon black and an abrasive. The non-magnetic powder can comprise known compounds commonly used in the field of magnetic recording media.

The dry thickness of the uppermost magnetic layer of the recording medium of the present invention is preferably not more than 1.5 $\mu$m and more preferably not more than 1 $\mu$m.

If the dry thickness of the uppermost magnetic layer is more than 1.5 $\mu$m, the electromagnetic conversion characteristics are not improved.

The dry thickness of the lower magnetic layer of the recording medium of the present invention is preferably at least 2.0 $\mu$m and more preferably at least 2.5 $\mu$m. If the thickness of the lower magnetic layer is less than 2.0 $\mu$m, the electromagnetic conversion characteristics are not improved. Particularly, it is considered that the moldability by calendering is thereby reduced.

Although not to be held to any particular theory, it is considered the magnetic recording medium -of the present invention exhibits excellent electromagnetic conversion characteristics for the following reason.

Since the Tg of the polyurethane resin contained in the lower magnetic layer is lower than that of the polyurethane resin contained in the uppermost magnetic layer, calender moldability is increased. Moreover, since the polyurethane resin contained in the uppermost magnetic layer has a high Tg, it is considered that irregularities of the base surface seldom appear on the surface of the magnetic layer at the time of calendering, such that the electromagnetic conversion characteristics are excellent. Moreover, since the uppermost magnetic layer after calendering is hard and the lower layer becomes soft, the total magnetic layer is flexible, but the surface layer is hard to thereby provide excellent running durability.

Various additives such as a dispersing agent, a lubricating agent, an abrasive, and an antistatic agent may be added to the coating liquid of the magnetic layer by techniques known in the art depending on the application of the recording medium.

Dispersing agents which can be used in the coating liquid of the magnetic layer of the present invention include a fatty acid having 12 to 18 carbon atoms ($R_1COOH$, wherein $R_1$ is an alkyl or alkenyl group having 11 to 17 carbon atoms) such as caprylic acid, captic acid, lauric acid, myristic acid, palmitic acid, stearic acid, oleic acid, elaidic acid, linoleic acid, linolenic acid or stearolic acid; metal soaps comprising an alkali metal (Li, Na, K) of the fatty acid, and an alkali earth metal (Mg, Ca, Ba) of the fatty acid; aliphatic acid amides; polyalkyleneoxide alkyl phosphates; lecithin; and trialkylpolyolefinoxy tetraammonium salts (wherein the alkyl has 1 to 5 carbon atoms and the olefin includes ethylene, propylene, etc.).

Further, higher alcohols having at least 12 carbon atoms and sulfates may be used as the dispersing agents. These dispersing agents are preferably added to the coating liquid of the magnetic layer in an amount of 0.5 to 20 parts by weight based on 100 parts by weight of binder. Examples of such dispersing agents are disclosed in JP-B-39-28369, JP-B-44-17945, JP-B-48-7441, JP-B-48-15001, JP-B-48-15002, JP-B-48-16363, and JP-B-50-4121 and U.S. Pat. Nos. 3,387,993 and 3,470,021.

The suitable lubricating agents used in the present invention include silicon oil (e.g., dialkylpolysiloxane of which the alkyl moiety has 1 to 5 carbon atoms, dialkoxypolysiloxane of which the alkoxy moiety has 1 to 4 carbon atoms, monoalkylmonoalkoxypolysiloxane of which the alkyl moiety has 1 to 5 carbon atoms and the alkoxy moiety has 1 to 4 carbon atoms, phenylpolysiloxane, and fluoroalkylpolysiloxane of which the alkyl moiety has 1 to 5 carbon atoms); electroconductive fine powders such as carbon black, graphite, and carbon black graft poisoner; inorganic fine powders such as molybdenum disulfide and tungsten disulfide; organic fine powders such as polyethylene, polypropylene, polyethylene-vinyl chloride copolymer, and polytetrafluoroethylene; α-olefin polymer; unsaturated aliphatic hydrocarbon having about 20 carbons which is liquid at ordinary temperature and wherein n-olefin double bond is bonded to the end carbon; and fatty acid esters composed of monobasic fatty acid having from 12 to 20 carbon atoms and monohydric alcohol having from 3 to 12 carbon atoms. These lubricating agents are generally added in an amount of from 0.2 to 20 parts by weight based on 100 parts by weight of binder. Such lubricating agents are disclosed in JP-B-43-23889, JP-B-46-40461, JP-B-47-15621, JP-B-48-18482, JP-B-47-28043, JP-B-47-30207, JP-B-47-32001, JP-B-48-7442, JP-B-49-14247, and JP-B-50-5042, U.S. Pat. Nos. 3,470,021, 3,492,235, 3,497,411, 3,523,086, 3,625,760, 3,630,772, 3,634,253, 3,642,539, and 3,687,725, *IBM Technical Disclosure Bulletin*, Vol. 9, No. 7, p. 779 (December, 1966), and *Elektronik*, 1961, No. 12, p. 380.

As the abrasive, those generally usable materials may be used which include fused alumina, silicon carbide, chromium oxide, corundum, artificial corundum, diamond, artificial diamond, garnet, emery (principal constituent: corundum and magnetite) and the like. These abrasives are to be used in Mohs' hardness of at least 5 and the average particle size range of from 0.05 to 5 $\mu$m, and particularly preferably from 0.1 to 2 $\mu$m. These abrasives are generally added in an amount of from 0.5 to 20 parts by weight based on 100 parts by weight of binder.

The suitable antistatic agents used in the present invention include electroconductive fine powders such as carbon black, graphite or carbon black graft polymer; natural surface active agents such as saponin; nonionic surface active agents such as an alkylene oxide type agent, a glycerin type agent or a glycidol type agent; cationic surface active agents such as higher alkyl amines, quaternary ammonium salts, pyridine, and other heterocyclic compounds, phosphinium or sulfonium salts; anionic surface active agents such as carboxylic acid, a sulfonic acid, a phosphoric acid, or a compound having an acidic group such as a sulfate or phosphate group; and amphoteric surface active agents such as amino acid, aminosulfonic acids, or a sulfate or a phosphate of aminoalcohol. The electroconductive fine powders are added in an amount of from about 0.5 to 15 parts by weight based on 100 parts by weight of binder and the surface active agents are added in an amount of from about 0.2 to 5 parts by weight based on 100 parts by weight of binder.

Such surface active agents used as an antistatic agent are disclosed in JP-B-46-22726, JP-B-47-24881, JP-B-47-26882, JP-B-48-15440, and JP-B-48-26761, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, West German Patent Application (OLS) 1,942,665, British Patents 1,077,317 and 1,198,450, *Synthesis of Surface Active Agents and the Applied Technology Thereof,* by Ryohei Oda et al., published by Maki Shoten in 1964; A. M. Schwaltz & J. W. Baily, *Surface Active Agents,* Interscience publication corporation, 1958 Edition; J. P. Sisley, *Encyclopedia of Surface Active Agents,* Vol. 2, Chemical Publish Company, 1964 Edition; and *Kaimen Kasseizai Binran (Manual of Surface Active Agents),* Sixth Edition, Sangyo Tosho Co., Ltd. (Dec. 20, 1966).

The magnetic coating liquid prepared using the above described materials is coated on the non-magnetic support by the following method. First, the components of the magnetic layer such as the resin component for the lower magnetic layer, the ferromagnetic powder, a hardener and optional components as required, are kneaded along with a solvent to prepare a coating liquid for the lower magnetic layer. A coating liquid for the uppermost magnetic layer is prepared in the same manner as for the lower magnetic layer.

The magnetic recording medium of the present invention can be prepared by applying a coating liquid for the lower magnetic layer on a non-magnetic support which is running, and continuously coating a coating liquid for the uppermost magnetic layer on the lower magnetic layer while it is in a wet state (this coating means being called "simultaneously coating"), in a manner such that the dry thickness of the uppermost magnetic layer is from 0.03 to 1.5 $\mu$m, and preferably 0.1 to 1.0 $\mu$m. For simultaneously coating the above upper and lower layers using an extrusion coating machine is employed for coating, two or more machines are provided and extrusion coating is carried out continuously in such a manner as to provide multi-layered magnetic layers on both sides of the non-magnetic support which is running. Alternatively, two or more machines are employed with a clearance such that the lower magnetic layer is not subjected to drying and can be kept wet (namely, in the state that the coated layer contains a solvent and exhibits adhesive properties).

For coating the above magnetic coating liquid, air doctor coating, blade coating, rod coating, extrusion coating, air knife coating, squeeze coating, dip coating, reverse roll coating, transfer roll coating, gravure coating, kiss coating, cast coating, spray coating, or spin coating, for example, can be employed. In the present invention, extrusion coating for simultaneous multilayer coating with two slots as described in JP-A-62-124631 is particularly preferably employed.

The uppermost magnetic layer as produced by the above method is as thin as 0.03 to 1.5 $\mu$m and is uniform in thickness, and also has a smooth surface, such that the magnetic recording medium of the present invention has excellent running durability and electromagnetic conversion characteristics.

The above magnetic coating liquid is applied in a manner such that the thickness of the magnetic layer of the magnetic recording medium (total thickness of the lower layer and the uppermost layer) is within a range of from 2.5 to 10 $\mu$m.

A backing layer may be provided on the backside of the non-magnetic support opposite to the side of the support having provided thereon the magnetic layers. The backing layer may be applied by coating onto the backside of the support a coating liquid comprising a binder and a granular component (e.g., an abrasive and an antistatic agent) and if necessary a lubricant, for example, these components being dispersed in an organic solvent.

An adhesive layer may be provided on one or both surfaces of the non-magnetic support on which the magnetic coating liquid and the backing layer coating liquid are applied.

The thus coated magnetic layer is generally subjected to magnetic field orientating treatment to orient the ferromagnetic powder contained in the coated layer, and is thereafter, dried.

After drying, the coated layer is subjected to surface smoothing treatment using, for example, supercalender rolls. This surface smoothing treatment removes voids formed during the removal of the solvent during the drying process and increases the rate of charging of the ferromagnetic powder in the magnetic layer. A magnetic recording medium having excellent electro-magnetic conversion characteristics is thus obtained.

The laminate which has been subjected to hardening treatment is then cut into the desired form. This cutting can be carried out under conditions generally employed in the art by the use of, e.g., a cutter such as a slitter.

The magnetic recording medium of the present invention may comprise three or more layers as long as the two uppermost and lower magnetic layers having the above characteristics are present. For example, the lower magnetic layer may comprise a plurality of magnetic layers, and a non-magnetic layer may be interposed therebetween.

In the magnetic recording medium of the present invention, since a polyurethane resin having a low Tg is contained in the lower magnetic layer, calender moldability is improved. Furthermore, since the uppermost magnetic layer is thin and even though the uppermost layer is formed of a binder having poor moldability, the uppermost layer is influenced by the smoothness of the lower layer. Thus, the magnetic layer as a whole is smooth.

After hardening, the still life under temperatures as low as 5° C. is improved, because the upper magnetic layer contains a polyurethane resin having a high Tg. Particularly, the uppermost layer has a high hardness because of the high Tg polyurethane resin, such that the recording medium tends not to become scratched. On the other hand, since a polyurethane resin having a low Tg is used in the lower magnetic layer, and even though the lower magnetic layer is somewhat inferior to the upper magnetic layer with respect to durability, the lower layer does not come into direct contact with the magnetic head, such that a high durability is not required for the lower layer.

Moreover since the lower magnetic layer has a low Tg, the adhesive property between the lower lower and the non-magnetic support is markedly improved. In the present invention, the dispersibility and adhesive properties of the lower magnetic layer can be improved without a change in the ratio of the binder having a high hardness (e.g., vinyl chloride or vinyl acetate) to the soft binder (e.g., polyurethane), namely, without a decrease in the Young's modulus (durability) of the lower magnetic layer.

In the present invention, the electromagnetic conversion characteristics of the upper magnetic layer are improved by increasing the $S_{BET}$ of the ferromagnetic powder and also by decreasing the content of the binder. As a result, still and running durability tend to decrease. However the electromagnetic conversion characteristics and the running properties are both improved by increasing the Tg of the polyurethane resin.

The present invention is described in greater detail with reference to the following examples. All parts are given by weight.

EXAMPLE 1

| Lower Magnetic Layer | |
| --- | --- |
| Cobalt-modified iron oxide (Hc 800 Oe, $S_{BET}$ 25 m$^2$/g) | 100 parts |
| Vinyl chloride-vinyl acetate-maleic anhydride copolymer (composition ratio = 86:13:1, degree of polymerization = 400) | 10 parts |
| Polyesterpolyurethane resin (the glass transition temperature is shown in Table 1) | 5 parts |
| Carbon black (particle size: 0.05 μm) | 3 parts |
| Butyl stearate | 1 part |
| Stearic acid | 2 parts |
| Butyl acetate | 200 parts |
| Upper Magnetic Layer | |
| Cobalt-modified iron oxide (Hc 900 Oe, $S_{BET}$ is shown in Table 1) | 100 parts |
| Vinyl chloride-vinyl acetate-maleic anhydride copolymer (composition ratio = 86:13:1, degree of polymerization = 400) | Shown in Table 1. |
| Polyesterpolyurethane resin (the glass transition temperature is shown in Table 1) | Shown in Table 1. |
| Carbon black (particle size: 0.05 μm) | 3 parts |
| α-Alumina (particle size: 0.3 μm) | 3 parts |
| Butyl stearate | 1 part |
| Stearic acid | 2 parts |
| Butyl acetate | 200 parts |

The coating liquids of the lower and uppermost magnetic layers were kneaded and dispersed by the use of a sandmill. To the coating liquid for the lower magnetic layer, polyisocyanate (Colonate L-75, produced by Nippon Polyurethane Co., Ltd.) was added in an amount of 5 parts, and to the coating liquid for the upper magnetic layer, the polyisocyanate was added in the amount shown in Table 1. In addition, 40 parts of butyl acetate were added to each coating liquid. The resulting mixture were passed through a filter having an average pore diameter of 1 μm to provide a coating liquid for the lower magnetic layer and a coating liquid for the uppermost magnetic layer.

The coating liquid for the lower layer was coated in a dry thickness of 3.0 μm. Immediately after the coating of the lower layer, the coating liquid for the uppermost magnetic layer was coated in a dry thickness of 0.5 μm on a 15 μm thick polyethylene terephthalate support by multi-layer coating. While the two layers were still in a wet state, the ferromagnetic powder contained therein was orientated by the use of a cobalt magnet and solenoid. After drying, supercalender treatment was applied, and the medium was slit to a width of ½ inch to obtain a video tape. In the case of Sample No. 31, only the upper layer was a single layer.

The recording media were evaluated as described below, the results of which are shown in Tables 1 and 2 below.

TABLE 1

| Sample No. | Tg of Urethane of Upper Layer (°C.) | Tg of Urethane of Lower Layer (°C.) | Specific Surface Area of Magnetic Material of Upper Layer (m²/g) | Amount of Binder of Upper Layer* (part) | Video Sensitivity (dB) |
|---|---|---|---|---|---|
| 1 | 50 | −60 | 45 | 22 | 2.7 |
| 2 | " | −50 | " | " | 2.6 |
| 3 | " | −30 | " | " | 2.4 |
| 4 | " | −10 | " | " | 2.1 |
| 5 | " | 0 | " | " | 1.7 |
| 6 | 30 | −30 | " | " | 2.6 |
| 7 | 35 | " | " | " | 2.5 |
| 8 | 70 | " | " | " | 2.2 |
| 9 | 100 | " | " | " | 2.0 |
| 10 | 110 | " | " | " | 1.7 |
| 11 | 35 | " | 30 | " | 2.2 |
| 12 | 50 | " | " | " | 2.1 |
| 13 | 70 | " | " | " | 1.9 |
| 14 | 100 | " | " | " | 1.7 |
| 15 | 110 | " | " | " | 1.4 |
| 16 | 35 | " | 38 | " | 2.3 |
| 17 | 50 | " | " | " | 2.2 |
| 18 | 70 | −30 | 38 | 22 | 2.0 |
| 19 | 100 | " | " | " | 1.8 |
| 20 | 110 | " | " | " | 1.5 |
| 21 | 35 | " | " | 9 | 2.3 |
| 22 | 50 | " | " | " | 2.2 |
| 23 | 70 | " | " | " | 2.0 |
| 24 | 100 | " | " | " | 1.8 |
| 25 | 110 | " | " | " | 1.5 |
| 26 | 35 | " | " | 32 | 2.2 |
| 27 | 50 | " | " | " | 2.1 |
| 28 | 70 | " | " | " | 1.9 |
| 29 | 100 | " | " | " | 1.7 |
| 30 | 110 | " | " | " | 1.4 |
| 31 | 50 | — | 45 | 22 | 0.0 |

*Ratio of vinyl chloride-vinyl acetate-maleic ahydride copolymer to polyesterpolyurethane to polyisocyanate = 2:1:1. Amount of binder includes the amount of copolymer, polyesterpolyurethane and polyisocyanate.

TABLE 2

| Sample No. | Y-S/N (dB) | Chroma Output (dB) | C-S/N (dB) | Still Life (min.) | Running Durability | Overall Evaluation |
|---|---|---|---|---|---|---|
| 1 | 2.5 | 2.6 | 1.6 | 110 | B | C |
| 2 | 2.4 | 2.5 | 1.5 | 120 or more | A | A |
| 3 | 2.2 | 2.3 | 1.3 | " | A | A |
| 4 | 1.9 | 2.0 | 1.0 | " | A | A |
| 5 | 1.4 | 1.6 | 0.5 | " | A | C |
| 6 | 2.4 | 2.5 | 1.5 | 20 | C | C |
| 7 | 2.3 | 2.4 | 1.4 | 60 | B | C |
| 8 | 2.0 | 2.0 | 1.1 | 120 or more | A | A |
| 9 | 1.8 | 1.9 | 0.9 | " | A | A |
| 10 | 1.4 | 1.6 | 0.5 | " | A | C |
| 11 | 1.5 | 2.1 | 0.9 | 100 | B | C |
| 12 | 1.4 | 2.0 | 0.8 | 120 or more | A | A |
| 13 | 1.2 | 1.7 | 0.6 | " | A | A |
| 14 | 1.0 | 1.6 | 0.4 | " | A | A |
| 15 | 0.6 | 1.3 | 0.0 | " | A | C |
| 16 | 2.0 | 2.2 | 1.1 | 90 | B | C |
| 17 | 1.9 | 2.1 | 1.0 | 120 or more | A | A |
| 18 | 1.7 | 1.8 | 0.8 | " | A | A |
| 19 | 1.6 | 1.7 | 0.6 | " | A | A |
| 20 | 1.0 | 1.4 | 0.2 | 120 or more | A | C |
| 21 | 1.6 | 2.2 | 1.0 | 60 | C | C |
| 22 | 1.5 | 2.1 | 0.9 | 120 or more | A | A |
| 23 | 1.3 | 1.8 | 0.7 | " | A | A |
| 24 | 1.1 | 1.7 | 0.5 | " | A | A |
| 25 | 0.7 | 1.4 | 0.1 | " | A | C |
| 26 | 1.5 | 2.1 | 0.9 | 110 | B | C |
| 27 | 1.4 | 2.0 | 0.8 | 120 or more | A | A |
| 28 | 1.2 | 1.7 | 0.6 | " | A | A |
| 29 | 1.0 | 1.6 | 0.4 | " | A | A |
| 30 | 0.6 | 1.3 | 0.0 | " | A | C |
| 31 | 0.0 | 0.0 | 0.0 | " | A | C |

(1) Video Sensitivity

Signal output at 4.2 MHz of a VHS type video deck relative to that of Sample No. 31 (upper layer=single layer) taken as 0 dB, and measured using an AG-3700 (produced by Matsushita Electric Co., Ltd.). Hereinafter, the standard tape and the relative measurement were the same.

(2) Y-S/N

S/N of a visually corrected luminance signal. Relative value.

(3) Chroma Output

Output of a 629 KHz video. Relative value.

(4) C-S/N

S/N of a visually corrected color signal. Relative value.

(5) Still Life (min.)

Time after which S/N decreased to 6 dB during reproduction in the still mode at 5° C.

(6) Running Durability

Evaluation after running the medium for 100 passes on 40 decks.

A: Decrease in output of less than 3 dB, and no increase in dropout, jitter, etc.

B: Decrease in output of less than 5 dB, and the dropout, jitter, etc. were somewhat increased.

C: Decrease in output of at least 5 dB, and the dropout, jitter, etc. were markedly increased.

Overall Evaluation

A Excellent

C Unsatisfactory for practical use.

From the results as shown in Tables 1 and 2, it is clearly seen that as long as the above Tg relation of the polyurethane resin contained in the upper and lower layers is satisfied, the recording medium is excellent in sensitivity, S/N, output and other electro-magnetic conversion characteristics. Furthermore, the still and running durability at temperatures as low as 5° C. is excellent. Thus, the magnetic recording media of the present invention (Sample Nos. 2–4, 8, 9, 12–14, 17–19, 22–24 and 27–29) are markedly superior in both the running durability and the electromagnetic conversion characteristics. On the other hand, Comparative Samples (Sample Nos. 1, 5–7, 10, 11, 15, 16, 20, 21, 25, 26, and 30) exhibited inferior running durability or electromagnetic conversion characteristics, the magnetic recording media were unsatisfactory in practical use. In the samples wherein the $S_{BET}$ of the ferromagnetic powder and the amount of the binder in the upper layer were within the specified ranges, improvement in properties was obtained. As compared with the single magnetic layer Sample (No. 31), the magnetic recording medium of the present invention has markedly improved electromagnetic conversion characteristics.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a plurality of magnetic layers containing a ferromagnetic powder dispersed in a binder, wherein:

the lower magnetic layer closest to the support contains as the binder at least one polyurethane resin having a glass transition temperature (Tg) of $-50°$ C. to $-10°$ C., and the uppermost magnetic layer contains as the binder at least one polyurethane resin having a glass transition temperature of from more than 40° C. to 100° C.;

the $S_{BET}$ of the ferromagnetic powder contained in the uppermost magnetic layer is greater than 35 m$^2$/g, and the total amount of the binder contained in the uppermost magnetic layer is from 10 to 30% by weight of the ferromagentic powder contained in the same layer;

the content of the polyurethane resin in each of the lower magnetic layer and the uppermost magnetic layer is from 10% by weight to 70% by weight based on the total weight of the binder contained in each magnetic layer; and the lower magnetic layer and the uppermost magnetic layer each contain a polyisocyanate hardener as a binder component; and wherein the dry thickness of the lower magnetic layer is at least 2.0 μm, and the dry thickness of the uppermost magnetic layer is not more than 1.5 μm.

2. A magnetic recording medium as in claim 1, wherein the polyurethane resin contained in the uppermost magnetic layer contains at least three OH groups per molecule thereof.

3. A magnetic recording medium as in claim 1, wherein the lower magnetic layer and the uppermost magnetic layer further contain a vinylchloride-based copolymer or a cellulose-based resin as a binder component.

4. A magnetic recording medium as in claim 1, wherein the coercive force of the uppermost magnetic layer is from 400 Oe to 2200 Oe, and the coercive force of the lower magnetic layer is from 1 to 0.1 times that of the uppermost magnetic layer.

5. A magnetic recording medium as in claim 1, wherein the polyurethane resin component of each of said magnetic layers contains a —COOM, —SO$_3$M, —SO$_4$M, —PO$_3$M$_2$, —OPO$_3$M$_2$, amino or ammonium salt group, wherein M represents a hydrogen, an alkali metal or ammonium, in an amount of from $10^{-7}$ to $10^{-3}$ equivalent per gram of the polyurethane resin.

6. A magnetic recording medium as in claim 1, wherein the polyurethane resin component of each of said magnetic layers contains an —OH, —SH or epoxy group in an amount of from $5 \times 10^{-5}$ to $200 \times 10^{-5}$ equivalent per gram of the polyurethane resin.

7. A magnetic recording medium as in claim 1, wherein the weight-average molecular weight of the binder in each of said magnetic layers is from 10,000 to 100,000.

8. A magnetic recording medium as in claim 1, wherein the weight-average molecular weight of the binder in each of said magnetic layers is from 20,000 to 60,000.

9. A magnetic recording medium as in claim 3, wherein the number-average molecular weight of the vinyl chloride-based resin or the cellulose-based resin is from 5,000 to 50,000.

10. A magnetic recording medium as in claim 1, wherein the total thickness of the lower magnetic layer and the uppermost magnetic layer is from 2.5 to 10 μm.

11. A magnetic recording medium prepared by:

(a) applying at least first and second magnetic coating liquids onto a non-magnetic support in a dry thickness of at least 2.0 μm and not more than 1.5 μm, respectively, to obtain at least a lower magnetic layer arranged closest to the support and a second magnetic layer as an uppermost magnetic layer, said magnetic layers each containing a ferromagnetic powder dispersed in a binder;

said lower magnetic layer containing as the binder at least one polyurethane resin having a glass transition temperature (Tg) of from $-50°$ C. to $-10°$ C.;

said uppermost magnetic layer containing as the binder at least one polyurethane resin having a glass transition temperature of from more than 40° C. to 100° C.;

the $S_{BET}$ of the ferromagnetic powder contained in the uppermost magnetic layer is greater than 35 m$^2$/g, and the total amount of the binder contained in the uppermost magnetic layer is from 10 to 30% by weight of the ferromagnetic powder contained in the same layer;

the content of the polyurethane resin in each of the lower magnetic layer and the uppermost magnetic layer is from 10% by weight to 70% by weight based on the total weight of the binder contained in each magnetic layer; and the lower magnetic layer and the uppermost magnetic layer each contain a polyisocyanate hardener as a binder component;

said uppermost magnetic layer being coated onto the lower magnetic layer prior to drying and while in a wet state;

(b) subjecting the at least two coated magnetic layers to magnetic field orienting treatment to orient the ferromagnetic powder contained therein;

(c) drying the at least two coated magnetic layers; and (d) subjecting the dried coated magnetic layers to surface smoothing treating.

* * * * *